(12) United States Patent
Brawn et al.

(10) Patent No.: US 7,400,591 B2
(45) Date of Patent: Jul. 15, 2008

(54) METHOD OF CREATING AN ADDRESS AND A DISCONTIGUOUS MASK FOR A NETWORK SECURITY POLICY AREA

(75) Inventors: John Melvin Brawn, San Jose, CA (US); Brian Jemes, Palo Alto, CA (US); Stephen F. Froelich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 11/142,643

(22) Filed: Jun. 1, 2005

(65) Prior Publication Data

US 2005/0232165 A1   Oct. 20, 2005

Related U.S. Application Data

(63) Continuation of application No. 09/855,862, filed on May 14, 2001, now Pat. No. 7,020,718.

(60) Provisional application No. 60/204,229, filed on May 15, 2000.

(51) Int. Cl.
*G06F 15/177* (2006.01)

(52) U.S. Cl. .................. 370/254; 370/392; 370/400; 370/476; 709/222; 709/226; 709/245; 711/217

(58) Field of Classification Search ............... None
See application file for complete search history.

(56) References Cited

U.S. PATENT DOCUMENTS 5,226,075 A   7/1993   Funk et al.

(Continued)

FOREIGN PATENT DOCUMENTS

WO    WO 98/57465    12/1998

(Continued)

OTHER PUBLICATIONS

Bellovin, et al., "Network Firewalls", IEEE Communications Magazine, Sep. 1994, pp. 50-57.

(Continued)

*Primary Examiner*—Wing F. Chan
*Assistant Examiner*—Brian Roberts

(57) ABSTRACT

A method of creating a discontiguous address plan for an enterprise is provided which includes determining a hierarchy of routing optimization for an enterprise, determining a number of route advertisement aggregation points at each level of the hierarchy, determining a number of network security policy areas for the enterprise, and determining a number of addresses for each of the network security policy areas. The number of addresses is rounded up to a power of the address scheme base number to produce a plurality of rounded addresses. The method further includes allocating an address range for each of the plurality of rounded addresses so that a starting address of the address range begins on a power of the base number and determining a size of the plurality of address ranges. The size of the plurality of address ranges is rounded up to a power of the base number to produce the size of a repeating policy pattern. The method further includes assigning an instance of the repeating policy pattern to each of the route advertisement aggregation points at each hierarchy, and determining an address and a mask for each of the network security policy areas in the repeating policy pattern.

20 Claims, 11 Drawing Sheets

U.S. PATENT DOCUMENTS

| | | | |
|---|---|---|---|
| 5,560,003 | A | 9/1996 | Nilsen et al. |
| 5,825,772 | A | 10/1998 | Dobbins et al. |
| 5,864,666 | A | 1/1999 | Shrader |
| 5,884,025 | A | 3/1999 | Baehr et al. |
| 5,968,176 | A | 10/1999 | Nessett et al. |
| 6,012,088 | A * | 1/2000 | Li et al. ............... 709/219 |
| 6,052,788 | A | 4/2000 | Wesinger, Jr. et al. |
| 6,108,760 | A * | 8/2000 | Mirsky et al. ............... 711/203 |
| 6,181,698 | B1 | 1/2001 | Hariguchi |
| 6,182,226 | B1 | 1/2001 | Reid et al. |
| 6,212,558 | B1 | 4/2001 | Antur et al. |
| 6,223,172 | B1 * | 4/2001 | Hunter et al. ............... 707/3 |
| 6,223,209 | B1 | 4/2001 | Watson |
| 6,243,754 | B1 | 6/2001 | Guerin et al. |
| 6,295,283 | B1 | 9/2001 | Falk |
| 6,304,973 | B1 | 10/2001 | Williams |
| 6,345,299 | B2 | 2/2002 | Segal |
| 6,353,886 | B1 | 3/2002 | Howard et al. |
| 6,453,419 | B1 | 9/2002 | Flint et al. |
| 6,507,873 | B1 * | 1/2003 | Suzuki et al. ............... 709/245 |
| 6,584,500 | B1 | 6/2003 | Arkko |
| 6,724,733 | B1 | 4/2004 | Schuba et al. |
| 6,728,782 | B1 | 4/2004 | D'Souza et al. |

FOREIGN PATENT DOCUMENTS

| | | |
|---|---|---|
| WO | WO 00/78001 | 12/2000 |

OTHER PUBLICATIONS

Loshin, Pete, "TCP/IP Clearly Explained", Margan Kaufman, 1999, pp. 38-40.

Francis, et al., "Flexible Routing and Addressing For a Next Generation IP", Applications, Technologies, Architectures, and Protocols for Computer Communication, Proceedings of the conference on communications architectures, protocols and applications, 1994, pp. 116-125.

* cited by examiner

METHOD OF CREATING AN ADDRESS AND A DISCONTIGUOUS MASK FOR A NETWORK SECURITY POLICY AREA

CROSS-REFERENCE TO RELATED APPLICATION

This application is a continuation of U.S. patent application Ser. No. 09/855,862, filed May 14, 2001, now U.S. Pat. No. 7,020,718 which claims priority from U.S. provisional patent application Ser. No. 60/204,229, filed May 15, 2000, which are herein incorporated by reference for all purposes.

BACKGROUND OF THE INVENTION

1. Field of the Invention

The present invention generally relates to a system and method of assigning discontiguous address ranges to a plurality of repeating address blocks, and more particularly relates to a system and method of aggregating discontiguous address ranges into addresses and masks, using a plurality of repeating address blocks, for the efficient implementation of network policies.

2. Description of the Related Art

With the increase in popularity of the Internet, the widespread deployment of intranets, and the growing use of Internet protocol (IP) based network technologies, many enterprises have established private networks which have become difficult and costly to manage effectively. In particular, enterprises having a network of physical locations and separate network policies have found it difficult and costly to manage their routing infrastructure and policy implementation infrastructure (such as firewalls). The difficulty and complexity of managing these two infrastructures increase as a function of the increased number of separate network address ranges, which represent a single network policy at a single routing location.

Some enterprises have been successful in reducing the complexity and cost of managing their routing infrastructure by creating an enterprise network address plan that places address ranges representing the same routing locations adjacent to each other, irrespective of the different policies these address ranges represent. Unfortunately, an address plan that is designed to be more highly efficient for route advertisement purposes is less efficient for policy implementation.

Other enterprises have purposefully reduced the complexity and cost of managing their policy implementation infrastructure by creating an address plan that places address ranges representing similar policy areas adjacent to each other irrespective of routing location. In this implementation, the adjacent address ranges with a similar policy can be aggregated together into a fewer number of larger ranges in order to gain efficiencies and cost reductions in the policy implementation infrastructure. This aggregation has the opposite effect on route advertisement, causing the routing infrastructure to be more costly and inefficient.

Currently, most enterprise networks aggregate or assign network addresses, i.e., allocate network address space, in one of three ways:

(1) Randomly Allocating Address Ranges. The first way of assigning network addresses is to randomly assign ranges of addresses. The ranges of addresses are assigned as needed or requested in order to accommodate the needs of subnets, which are located at specific physical locations or are connected to specific points of network presence and which have specific policy requirements. For example, assume a company with a company-wide network wishes to connect five locations on two continents using three different policy spaces protected by network firewalls. Also, assume that the company has 13 subnets, each of which includes all the devices within the same security policy space at the same location. The following table illustrates the number of network devices in each policy area at each routing location.

| Location | Continent | User Network Devices | Production Network Devices | Web Server Network Devices |
|---|---|---|---|---|
| Palo Alto | N. America | 2100 | 130 | 80 |
| Atlanta | N. America | 600 | 60 | 35 |
| London | Europe | 130 | 12 | 0 |
| Paris | Europe | 100 | 18 | 0 |
| Frankfurt | Europe | 240 | 50 | 60 |

An example of an IP based random distribution would be a company that uses net-10 addressing e.g., IP addresses 10.0.0.0 through 10.255.255.255, for it's internal network devices. In this example, a person or group coordinates the responsibilities to ensure than every location or group within the company is given a unique range of addresses. In the random distribution, the person or group issues ranges of addresses in sequential order based on requests received from the various groups within the company.

The address table in this example may be as follows:

| Location | Network Policy | Starting Address | Ending Address | Number of Addresses |
|---|---|---|---|---|
| Palo Alto | User Net | 10.0.0.0 | 10.0.2.255 | 768 |
| London | User Net | 10.0.3.0 | 10.0.3.255 | 256 |
| Palo Alto | Production Net | 10.0.4.0 | 10.0.4.255 | 256 |
| London | Production Net | 10.0.5.0 | 10.0.5.255 | 256 |
| Atlanta | User Net | 10.0.6.0 | 10.0.9.255 | 1024 |
| Paris | User Net | 10.0.10.0 | 10.0.10.255 | 256 |
| Atlanta | Production Net | 10.0.11.0 | 10.0.11.255 | 256 |
| Palo Alto | User Net | 10.0.12.0 | 10.0.19.255 | 2048 |
| Frankfurt | Production Net | 10.0.20.0 | 10.0.20.255 | 256 |
| Palo Alto | Web Net | 10.0.21.0 | 10.0.21.255 | 256 |
| Atlanta | Web Net | 10.0.22.0 | 10.0.22.255 | 256 |
| Frankfurt | User Net | 10.0.23.0 | 10.0.24.255 | 512 |
| Paris | Production Net | 10.0.25.0 | 10.0.25.255 | 256 |
| Frankfurt | Web Net | 10.0.26.0 | 10.0.26.255 | 256 |

FIG. 1 illustrates a graphical representation of a prior art randomly assigned address table. The left column shows the random distribution of subnets by routing location and the right column shows the random distribution of subnets by policy area.

A network that randomly assigns addresses is not suitable for optimizing the route advertisement of the addresses because the subnets that represent the addresses used at any particular location or geographic zone are not summarizable. Furthermore, randomly assigning addresses is not suitable for firewall access control list (ACL) optimization because the subnets that represent the same network security policy are not summarizable. ACLs are a common form of policy implementation.

The lack of route advertisement optimization can have a significant impact on large and highly distributed networks because route advertisement tables used by various network devices to correctly route network traffic can become very large. In a large network, stability problems can cause these very large route advertisement tables to be frequently retransmitted throughout the network using significant portions of available bandwidth on wide area connections and impacting router memory and CPU performance. Also, localized advertisements to network service providers are made more difficult and even impossible if local subnets cannot be aggregated to a sufficient size.

Moreover, the lack of ACL optimization can have a significant impact on large and highly distributed networks because ACL tables used by firewall devices to implement network security policies can become very large and complex. This impacts the performance of the firewall, firewall configuration systems, and the likelihood that the work of the personnel responsible for implementing security policy will be consistent and error free.

(2) Pre-Allocate Address Ranges by Geography. The second way of assigning network addresses is to pre-allocate address ranges by geographical location and zone. This way has tremendous advantages for network routing performance, i.e., optimizes route advertisement, because subnets can be aggregated into larger contiguous ranges to greatly reduce the size of route advertisement tables.

In this example, the optimized route advertisement address plan may be as follows:

| Location | Network Policy | Starting Address | Ending Address | Number of Addresses |
|---|---|---|---|---|
| Palo Alto | User Net | 10.0.0.0 | 10.0.2.255 | 768 |
| Palo Alto | Production Net | 10.0.3.0 | 10.0.3.255 | 256 |
| Palo Alto | User Nets | 10.0.4.0 | 10.0.11.255 | 2048 |
| Palo Alto | Web Net | 10.0.12.0 | 10.0.12.255 | 256 |
| Atlanta | User Net | 10.0.13.0 | 10.0.16.255 | 1024 |
| Atlanta | Web Net | 10.0.17.0 | 10.0.17.255 | 256 |
| Atlanta | Production Net | 10.0.18.0 | 10.0.18.255 | 256 |
| London | User Net | 10.0.32.0 | 10.0.32.255 | 256 |
| London | Production Net | 10.0.33.0 | 10.0.33.255 | 256 |
| Paris | Production Net | 10.0.34.0 | 10.0.34.255 | 256 |
| Paris | User Net | 10.0.35.0 | 10.0.35.255 | 256 |
| Frankfurt | User Net | 10.0.36.0 | 10.0.37.255 | 512 |
| Frankfurt | Web Net | 10.0.38.0 | 10.0.38.255 | 256 |
| Frankfurt | Production Net | 10.039.0 | 10.0.39.255 | 256 |

FIG. 2 illustrates a graphical representation of a prior art route advertisement optimized address table. The left column shows the distribution of subnets by routing location and the right column shows the distribution of subnets by policy area.

This address plan allows an aggregation at the city and continent level. As shown, the addresses in the range 10.0.0.0-10.0.12.255 represent the subnets in Palo Alto. Also, the addresses in the range 10.0.0.0-10.0.31.255 represent the subnets in North America. The blank space represents the address space reserved for future use. Pre-allocating address ranges by geography allows all routers in Europe to carry a single route advertisement table entry for North America as well as a single route advertisement for each European site. It also allows a new site in North America to be assigned unused address space within the range reserved for North America. By doing this, the new site can be implemented without changing the route advertisement aggregations at any of the European sites.

The route advertisement optimization, however, is gained at the expense of security policy or ACL optimization. The lack of ACL optimization can have a significant impact on large and highly distributed networks because ACL tables used by firewall devices to implement security policy can become very large and complex. This impacts the performance of the firewall, firewall configuration systems, and the likelihood that the work of the personnel responsible for implementing security policy will be consistent and error free.

(3) Pre-Allocate Address Ranges by Security Policy. The third way of assigning network addresses is to pre-allocate address ranges by security policy. This way optimizes the ACL assignment and can be very helpful in a large and complex network environment because it can reduce the size and complexity of ACLs and other firewall configurations.

In this example, the optimized ACL address plan may be as follows:

| Location | Network Policy | Start Address | End Address | Number of Addresses |
|---|---|---|---|---|
| Palo Alto | User Net | 10.0.0.0 | 10.0.2.255 | 768 |
| London | User Net | 10.0.3.0 | 10.0.3.255 | 256 |
| Atlanta | User Net | 10.0.4.0 | 10.0.7.255 | 1024 |
| Paris | User Net | 10.0.8.0 | 10.0.8.255 | 256 |
| Palo Alto | User Net | 10.0.9.0 | 10.0.16.255 | 2048 |
| Frankfurt | User Net | 10.0.17.0 | 10.0.17.255 | 256 |
| Paris | Production Net | 10.0.32.0 | 10.0.32.255 | 256 |
| Atlanta | Production Net | 10.0.33.0 | 10.0.33.255 | 256 |
| Frankfurt | Production Net | 10.0.34.0 | 10.0.34.255 | 256 |
| Palo Alto | Production Net | 10.0.35.0 | 10.0.35.255 | 256 |
| London | Production Net | 10.0.36.0 | 10.0.36.255 | 256 |
| Palo Alto | Web Net | 10.0.40.0 | 10.0.40.255 | 256 |
| Frankfurt | Web Net | 10.0.41.0 | 10.0.41.255 | 256 |
| Atlanta | Web Net | 10.0.42.0 | 10.0.42.255 | 256 |

FIG. 3 illustrates a graphical representation of a prior art ACL optimized address table. The left column shows the distribution of subnets by routing location and the right column shows the distribution of subnets by policy area. This address plan allows an aggregation of subnets with the same security policy.

As shown in the table, all addresses in the range 10.0.0.0-10.0.31.255 represent User Nets subnets. This allows ACLs on firewalls protecting Production Nets and Web Nets to identify all User Net addresses in a single ACL entry. Also, it allows a new User Net subnet to be assigned address space from the unused portion of the User Net address range. Hence, the new subnet is given the same access into Production subnets and Web subnets without having to change the ACL entries or other network policy configurations on those existing firewall devices.

This ACL optimization, however, is gained at the expense of geographic route advertisement optimization. The lack of route advertisement optimization can have a significant impact on large and highly distributed networks because tables of route advertisements used by various network devices to correctly route network traffic can become very large. In a large network, stability problems can cause these very large route advertisement tables to be frequently retransmitted throughout the network using significant portions of available bandwidth on wide area connections and impacting router memory and CPU performance. Also, localized advertisements to network service providers are made more difficult and even impossible if local subnets cannot be aggregated to a sufficient size.

Once the address ranges are allocated, routers are used to implement the address ranges. Many popular routers implement address ranges using a single address and a mask. That is, in order for a router to determine whether a target network address is within the address range specified by the address and mask, a binary comparison is made using the address and mask of the address range and the target network address. For example, in an 8-bit binary addressing scheme having valid addresses from 0 to 255, the address range from 0-31 can be described with an address of 0 (0000 0000) and a mask of 224 (1110 0000). In the binary comparison operation, the target network address is compared on a bit by bit basis to the address range using the mask. In each binary digit, a one value in the mask means that the target address must match the range address. A zero value means that the target address does not have to match the range address. The following two examples illustrate this concept.

EXAMPLE 1

Target Network Address of 18.

| Range Address | 0 0 0 0 0 0 0 0 |
|---|---|
| Mask | 1 1 1 0 0 0 0 0 |
| Target Address | 0 0 0 1 0 0 1 0 |

As shown in the table of example 1, the target address of 18 falls within the range address 0 and the mask 224 because in each bit position with a mask value of one, the range address and the target address match. Each bit position where the mask value is zero is not considered.

EXAMPLE 2

Target Network Address of 37.

| Range Address | 0 0 0 0 0 0 0 0 |
|---|---|
| Mask | 1 1 1 0 0 0 0 0 |
| Target Address | 0 0 1 0 0 1 0 1 |

As shown in the table of example 2, the target address of 37 does not fall within the range of address 0 and the mask 224 because in the third bit position, the mask value is 1 but the range address and target address do not match. In this situation, the router does not implement the policy rule or routing decision, which is based on the address range, for this target address.

Some router manufactures use "inverse masks" to denote address ranges in ACLs. In an inverse mask, the operation of the mask bits of one and zero are reversed. That is, the address range of 0-31 in an address scheme of 0 to 255 is described with an address of 0 and a mask of 31 (0001 1111).

Not all network address/masking schemes are binary. X.121 is an example of a decimal (power of 10) address/masking scheme. In this scheme, an address and mask are often shown in a single entry by using "D" instead of an address digit to denote that any number will match for that specific digit. For example, an address/mask of 311040800DDD will match all addresses in the range of 311040800000-311040800999.

In a large enterprise having hundreds of networks or subnets, the difficulty of managing contiguous blocks of address ranges for the entire network remains and is unmanageable and unsupportable using current technology. Thus, in order to efficiently manage a routing infrastructure and a policy implementation infrastructure for an entire network, a need remains for a system and method of aggregating discontiguous address ranges into a small number of addresses and masks for the efficient implementation of network policies. The present invention fulfills this need as well as others.

SUMMARY OF THE INVENTION

A method of creating a discontiguous address plan for an enterprise is provided which includes determining a hierarchy of route advertisement optimization for an enterprise, determining a number of route advertisement aggregation points at each level of the hierarchy, determining a number of network security policy areas for the enterprise, and determining a number of addresses for each of the network security policy areas. The number of route advertisement aggregation points is rounded up to a power of a base number. The number of addresses is rounded up to a power of 2 (or other base number in non-binary address schemes) to produce a plurality of rounded addresses. The method further includes allocating an address range for each of the plurality of rounded addresses so that a starting address of the address range begins on a multiple of a power of the base number (usually 2) and determining a size of the plurality of address ranges. The size of the plurality of address ranges is rounded up to a multiple of a power of the base number to produce the size of a repeating policy pattern. The method further includes assigning an iteration of the repeating policy pattern to each of the route advertisement aggregation points at each hierarchy, and determining an address and a mask for each of the network security policy areas in the repeating policy pattern.

An advantage of the present invention includes providing a discontiguous address plan that allows thousands of discrete, different sized, and seemingly irregularly spaced address ranges to be accessed and identified by a small number of address and mask combinations. Another advantage includes providing an enterprise having a large complex network with a discontiguous network address plan configured to optimize for route advertisement, ACL entries, firewall configurations, and multiple network policies.

Other features and advantages of the present invention should become apparent from the following description of the preferred embodiment, taken in conjunction with the accompanying drawings, which illustrate, by way of example, the principles of the present invention.

BRIEF DESCRIPTION OF THE DRAWINGS

Embodiments of the present invention will now be described, by way of example only, with reference to the following drawings in which.

DESCRIPTION OF THE PREFERRED EMBODIMENT

Figure 1:
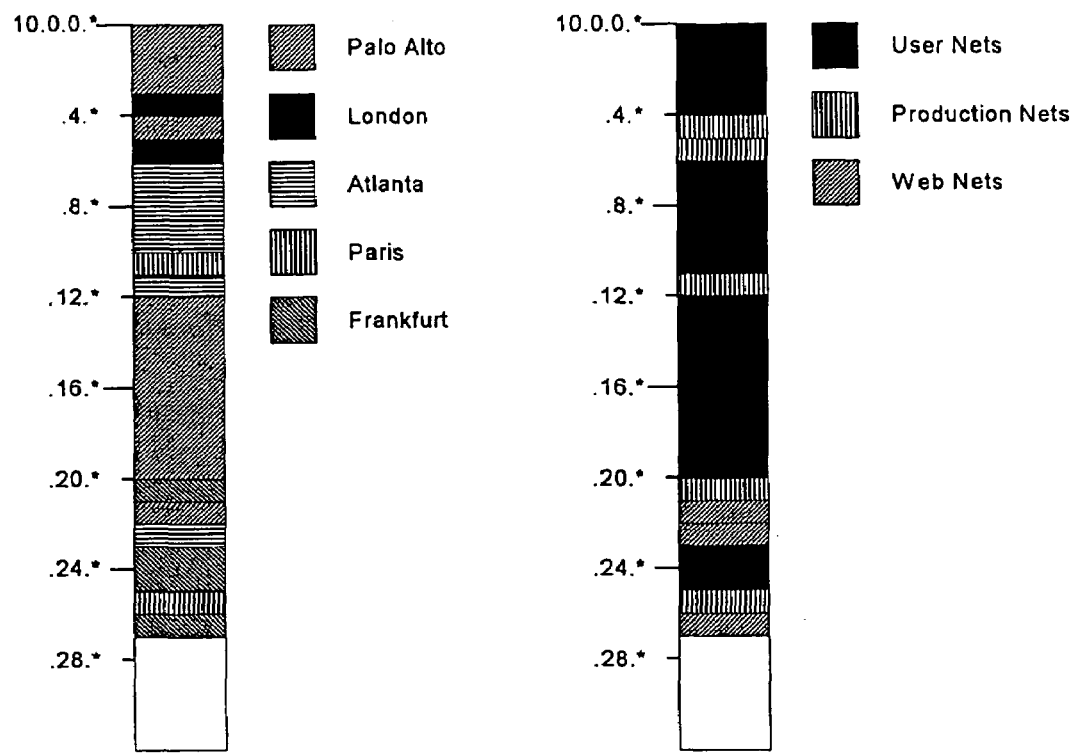
FIG. 1 is a graphical representation of a prior art randomly assigned address table.
Figure 2:
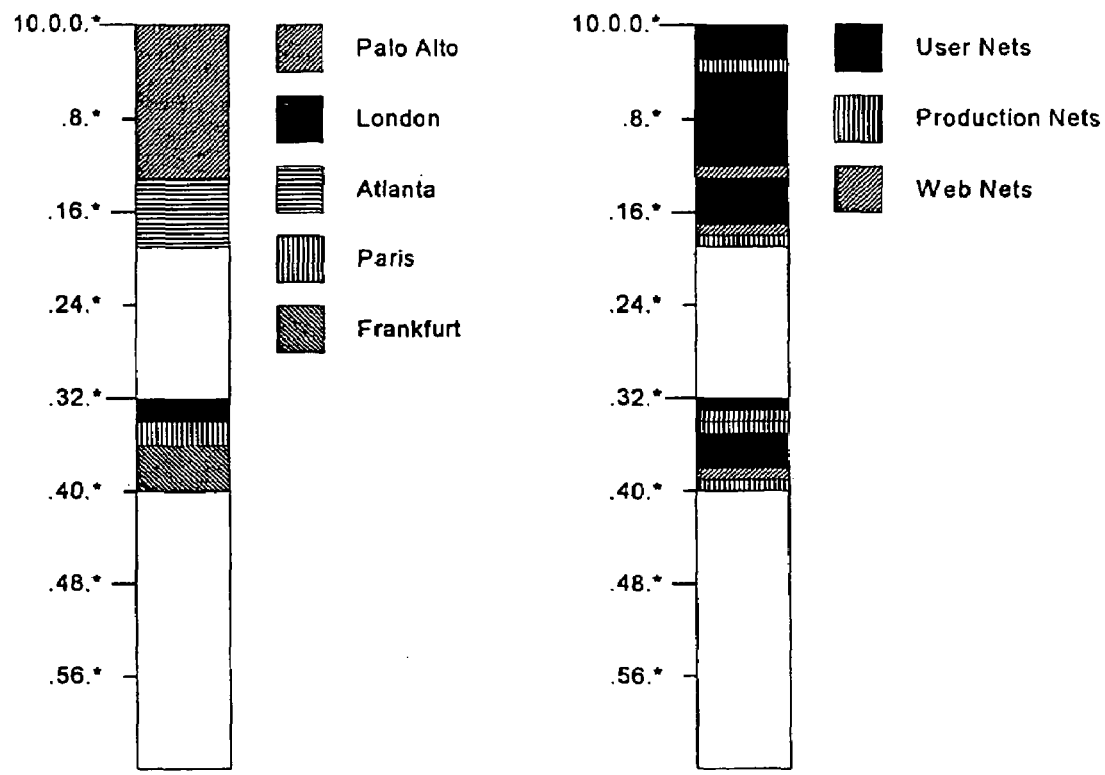
FIG. 2 is a graphical representation of a prior art route advertisement optimized address table.
Figure 3:
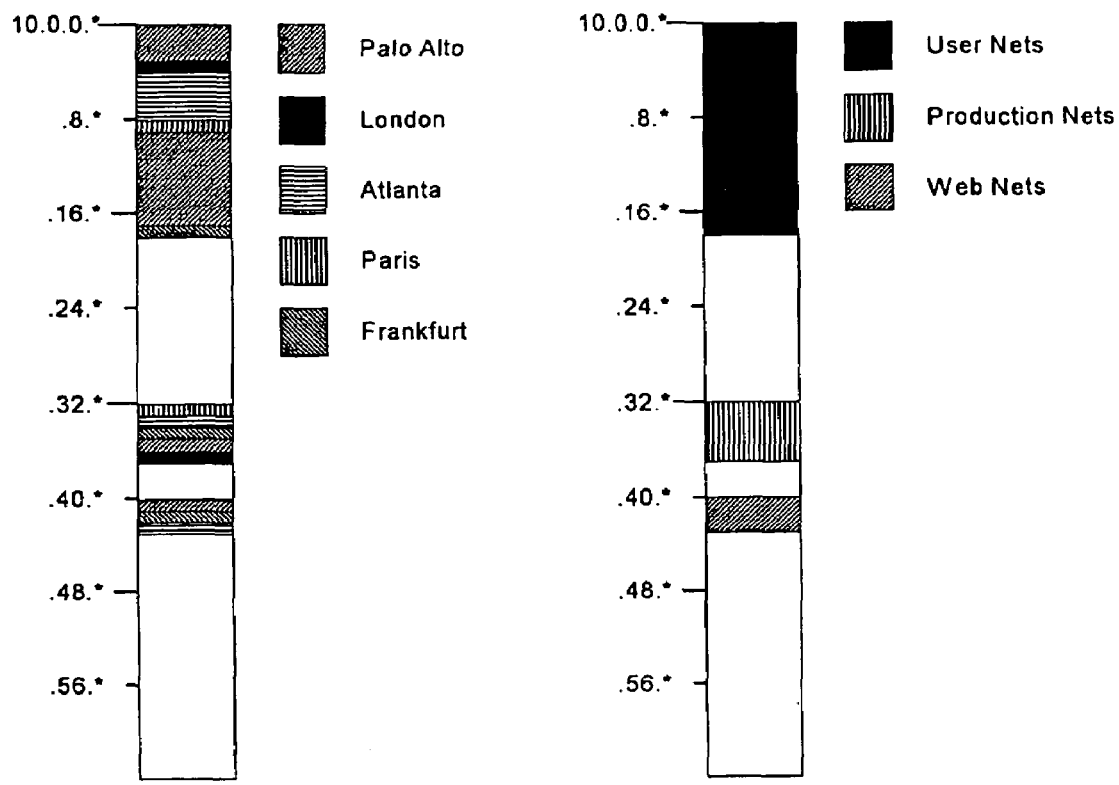
FIG. 3 is a graphical representation of a prior art ACL optimized address table.

In this description, the present invention is described in detail with regard to the drawing figures briefly described above. Similar labels and numbers on one drawing figure may represent the same element on other drawing figures. The following terms are used throughout this description. For purposes of construction, such terms have the following meanings:

The term "architect" unless otherwise specified, is intended to refer to a person or people responsible for designing an enterprise's network address plan.

The term "discontiguous," unless otherwise specified, is intended to refer to a plurality of binary ones and zeros that are not contiguous. In non-binary address mask schemes, "discontiguous" in intended to refer to a plurality of masked and unmasked digits that are not contiguous.

The term "policy area" unless otherwise specified, is intended to refer to a plurality of network address ranges all having the same network policy.

The term "policy pattern" unless otherwise specified, is intended to refer to a range of network addresses, which contain one or more policy areas.

Figure 4A:
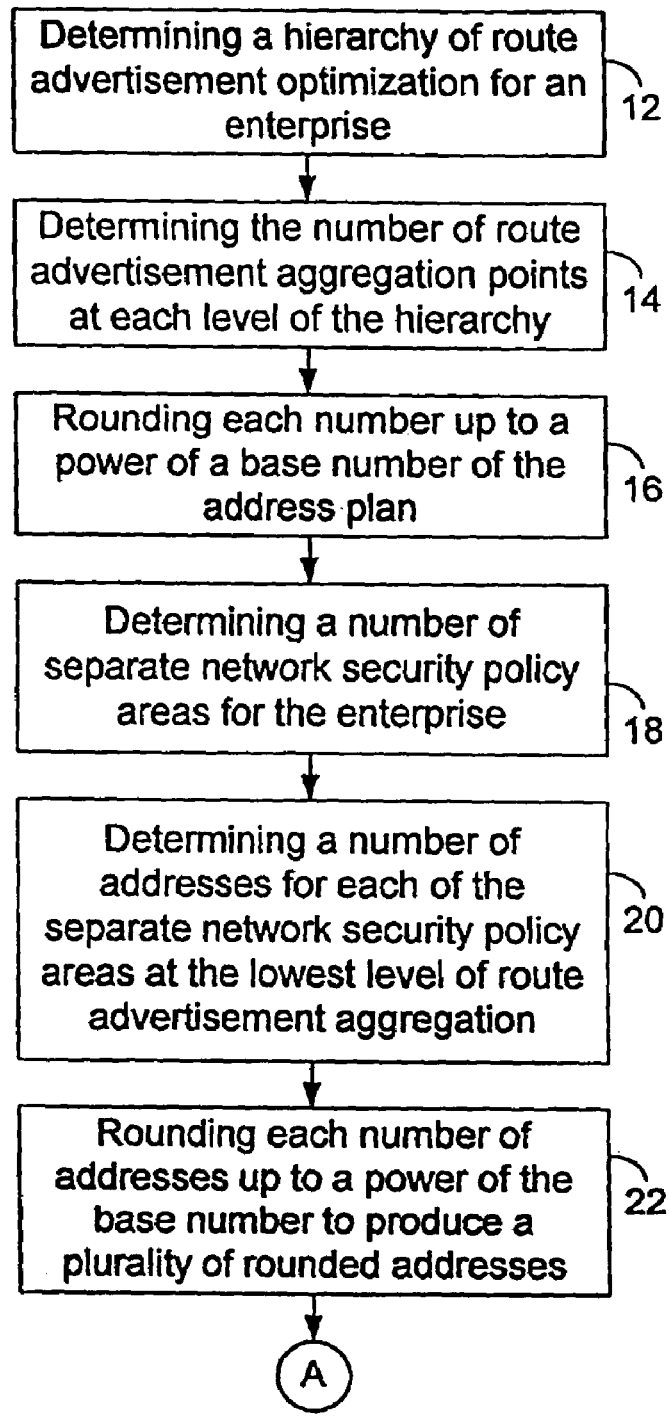
FIGS. 4A and 4B are is a simplified flow chart illustrating a method of creating a discontiguous address plan using an address and a mask.
Figure 4B:
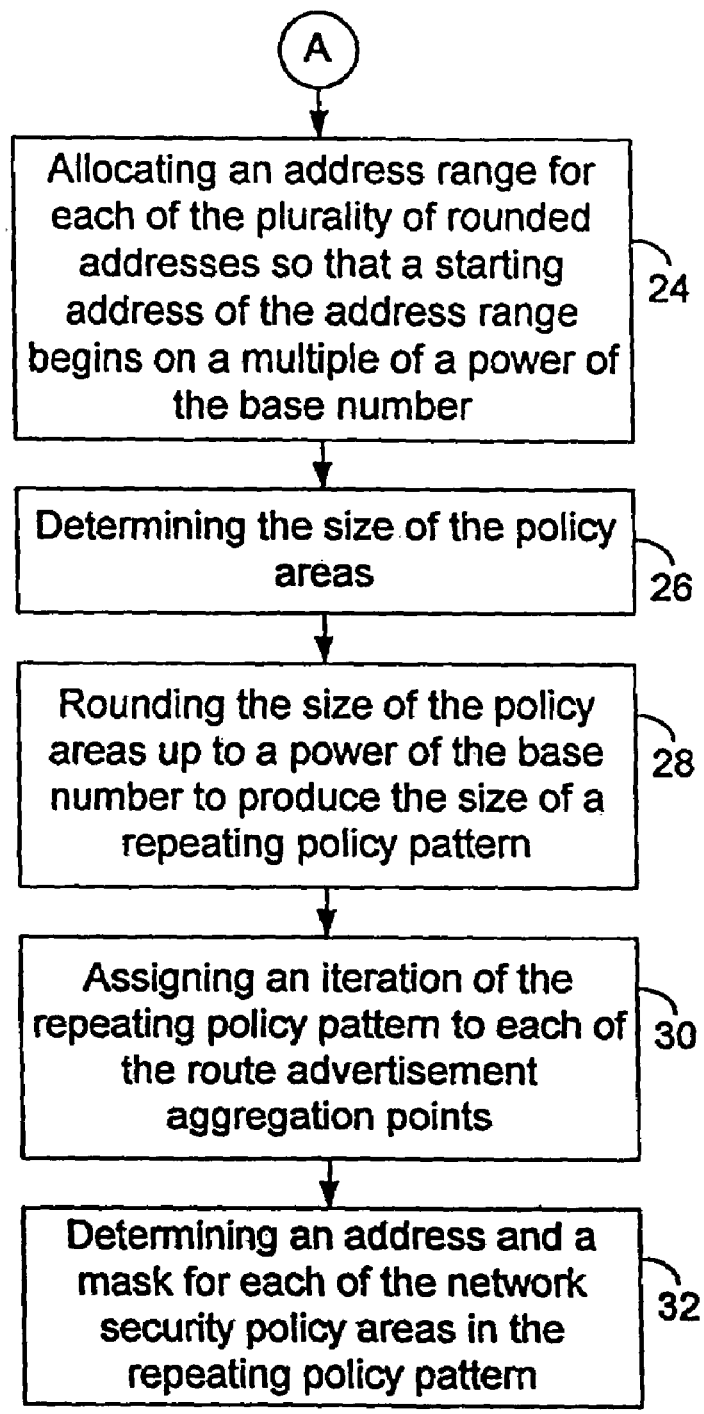

With reference now to the illustrative drawings, and particularly to FIGS. 4A and 4B, there is shown a simplified flow chart illustrating a method of creating a discontiguous address plan for an enterprise using an address and a mask. The method begins at step 12 when the enterprise network architect determines a hierarchy of route advertisement optimization based on the network topology and geography existing or planned to be used by the enterprise. That is, the architect determines at what level(s) the route advertisements should be aggregated. For example, one or more of the following levels can be used to determine how the route advertisements should be aggregated: a floor of a building, a building, a campus, a site, a city, a region, a state, a country, and a continent. In addition, other levels of aggregation can used solely or in combination with one ore more of these levels. In the example below, a city and continent aggregation has been described.

For each level of route advertisement optimization that is determined in step 12, a maximum number of lower level instances to be aggregated are determined (step 14). That is, the number of route advertisement aggregation points at each level of the hierarchy is determined at step 14. This maximum number is then rounded up to a power of the base number of the address scheme (step 16). Preferably, the maximum number is rounded up to a nearest power of the base number, e.g., 2, 3, 5, 6, 8, 10, 12 or 16. Using the example below, since there are a maximum of 3 cities in a continent, this number is rounded up to 4, and since there are 2 continents, this number is not rounded up.

At step 18, the architect determines the number of separate network policy or security policy areas for the enterprise. This number is usually determined by the network security policies of the enterprise. Examples of the network security policies may include user networks, server networks, production networks, web networks, de-militarized zones (DMZs), classified networks, open Internet access networks, wireless access networks, etc. In the example below, three separate network security policies have been implemented. These include user nets, production nets, and web nets.

At step 20, a number of addresses needed for each of the separate network or security policy areas at the lowest level of route advertisement aggregation is determined. In other words, the architect determines the number of network addresses that are needed in the largest instance for each of the separate network policy or security policy areas at the minimum level of route advertisement aggregation. The number is preferably determined by counting or estimating the number of devices for each of the separate network policy or security policy areas. For example, if the minimum level of route advertisement aggregation is a building, then the architect determines the number of network addresses that are needed to accommodate the devices in the largest user network in a single building throughout the enterprise. The architect allows for future growth when determining the number of network addresses for each of the separate network or security policy areas. This step is repeated for each of the separate network or security policy areas defined within the enterprise. For the example below, the largest user net is 2,100, the largest production net is 130, and the largest web net is 80 in any single city.

Once the number of addresses is determined for each of the separate network policy or security policy areas, the architect rounds these numbers up to a power of the base number of the address plan (step 22). For example, in a binary address scheme, these numbers are rounded up to 2, 4, 8, 16, 32, 64, etc. Preferably, these numbers are rounded up to a nearest power of the base number. For example, if the number of network addresses needed is 33 in an address scheme with a base number of 2, the number is rounded up to the nearest power of 2, which is 64. These numbers are the standard pre-allocation address range sizes for each of the separate network policy or security policy areas. Using the example numbers above, the user net might be rounded up from 2,100 to 4,096, the production net might be rounded up from 130 to 256, and the web net might be rounded up from 80 to 128.

The pre-allocation address range sizes identified by the rounded numbers are allocated or arranged such that the starting address falls on a multiple of the power of the base number defined by the address range size (step 24). For example, in a binary address scheme, an address range size of 32 can start at 0, 32, 64, 96, 128, etc. Preferably, the address ranges are arranged from the largest ranges to the smallest ranges. Using the numbers above, the user net is allocated the address range from 10.0.0.0-10.0.15.255, the production net is allocated the address range from 10.0.16.0-10.0.16.255, and the web net is allocated the address range from 10.0.17.0-10.0.17.127. Once the address ranges are allocated and arranged, the size of the policy areas is determined (step 26). The size of the policy areas is determined by adding up the size of the address ranges for each policy area. Alternatively, the size of the policy areas can be determined by rounding the ending address of the last address range up to a power of the base number. In this example, the ending address is 10.0.17.127 and the size of the policy areas is 0.0.17.128. The size of the policy areas is rounded up to a power of the base number (step 28), and preferably is rounded up to a nearest power of the base number. This rounded number is the size of the repeating policy pattern. In this example, the size of the policy areas is 0.0.17.128, which is rounded up to 0.0.32.0 to produce the size of the repeating policy pattern. Hence, the first repeating policy pattern is the address range 10.0.0.0-

10.0.31.255. Similarly, the second repeating policy pattern is the address range 10.0.32.0-10.0.63.255.

At step 30, the architect assigns an iteration of the repeating policy pattern to each of the route advertisement aggregation points at each hierarchy, i.e., route advertisement aggregation level. That is, the architect assigns specific policy area ranges from the repeating policy pattern to each location at the lowest level of route advertisement aggregation. Using the example above, the repeating policy ranges for each location at the lowest level of route advertisement aggregation is shown in the table below.

| Geography | Pattern Number | Address Range |
|---|---|---|
| Palo Alto | 0 | 10.0.0.0-10.0.31.255 |
| | User Nets | 10.0.0.0-10.0.15.255 |
| | Production Nets | 10.0.16.0-10.0.16.255 |
| | Web Nets | 10.0.17.0-10.0.17.127 |
| | Available | 10.0.17.128-10.0.31.255 |
| Atlanta | 1 | 10.0.32.0-10.0.63.255 |
| | User Nets | 10.0.32.0-10.0.47.255 |
| | Production Nets | 10.0.48.0-10.0.48.255 |
| | Web Nets | 10.0.49.0-10.0.49.127 |
| | Available | 10.0.49.128-10.0.65.255 |
| Available | 2 | 10.0.64.0-10.0.95.255 |
| Available | 3 | 10.0.96.0-10.0.127.255 |
| London | 4 | 10.0.128.0-10.0.159.255 |
| | | (The remainder of the policy ranges have been omitted.) |
| Paris | 5 | 10.0.160.0-10.0.191.255 |
| Frankfurt | 6 | 10.0.192.0-10.0.223.255 |
| Available | 7 | 10.0.224.0-10.0.255.255 |
| Continent | Pattern Range | Address Range |
| North America | 0-3 | 10.0.0.0-10.0.127.255 |
| Europe | 4-7 | 10.0.128.0-10.0.255.255 |

At step 32, an address and discontiguous mask for each of the network policy or security policy areas in the repeating policy pattern are determined. One of ordinary skill in the art will be able to determine the address and mask without implementing all of the steps of the method described above, i.e., steps 12 through 32. The address and discontiguous mask for the above example is shown in the table below.

| | |
|---|---|
| User Nets | Address 10.0.0.0, mask 255.255.16.0 |
| Production Nets | Address 10.0.16.0, mask 255.255.31.0 |
| Web Nets | Address 10.0.17.0, mask 255.255.31.128 |

In the above example, the address plan is optimized for route advertisement, security policy, and ACL deployment. In particular, each level of the route advertisement hierarchy (e.g., each city and each continent) is aggregated into a single address range. In addition, there are eight separate address ranges for each of the three network security policy areas. Using contiguous ACL masks, 24 ACL entries are required to define these address ranges. However, using discontiguous ACL masks, as shown in the above example, the 24 address ranges can be defined using 3 ACL entries, one for each network security policy area. The 3 ACL entries are (1) User Nets: address 10.0.0.0, mask 255.255.16.0, (2) Production Nets: address 10.0.16.0, mask 255.255.31.0, and (3) Web Nets: address 10.0.17.0, mask 255.255.31.128.

Figure 5:
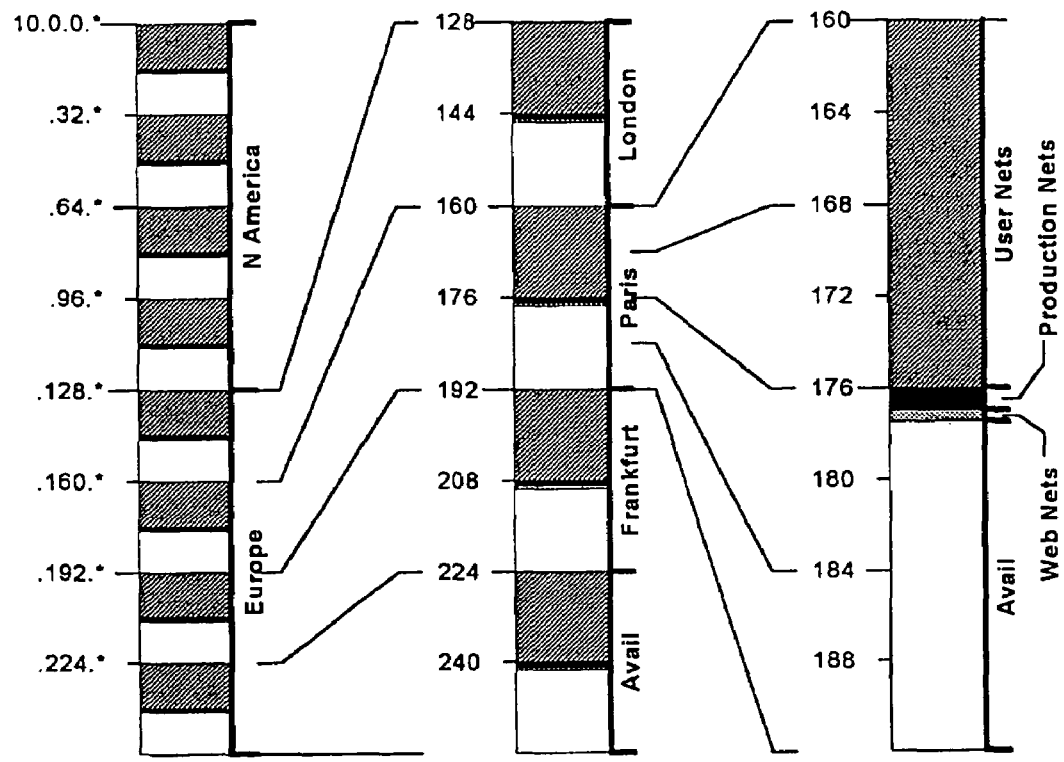
FIG. 5 is a graphical representation of an example address plan.

As shown in the above table, the address plan pre-allocates space for one future city in Europe and two future cities in North America. In addition, new policy areas in the unused space in each repeating pattern are available. FIG. 5 is a graphical representation of this example address plan.

Figure 6:
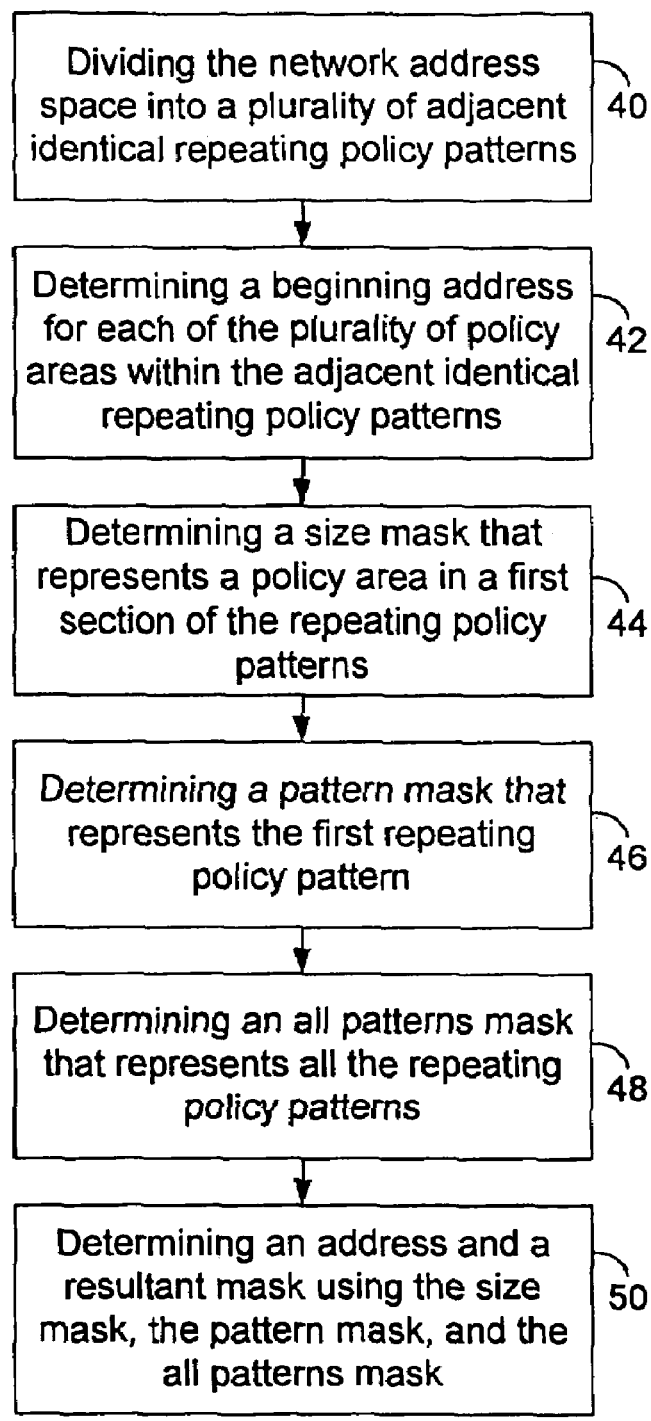
FIG. 6 is a simplified flow chart illustrating a method of determining a range address and mask for each policy area in the repeating pattern.

FIG. 6 is a simplified flow chart illustrating a method of determining an address and discontiguous mask for each network security policy area in the repeating policy pattern. The method begins by dividing the enterprise network address space into a plurality of adjacent identical repeating policy patterns (step 40). Preferably, this is implemented using the method described in steps 12 through 32 of FIGS. 4A and 4B. Alternatively, other methods known to those of ordinary skill in the art may be implemented. In a binary address scheme, the plurality of policy patterns is a multiple of a power of 2 and the size of each pattern is a multiple of a power of 2. Within each identical repeating policy pattern there are a plurality of policy areas, each having a size of a power of 2. For each of the plurality of policy areas, the first address of the policy area in the first repeating policy pattern is determined at step 42. This first address is typically referred to as a beginning or range address.

At step 44, a size mask representing the size of the policy area in the first repeating policy pattern is determined, at step 46, a pattern mask representing the size of the entire first repeating policy pattern is determined, and at step 48, an all pattern mask representing the size of all the repeating policy patterns is determined.

Figure 7:
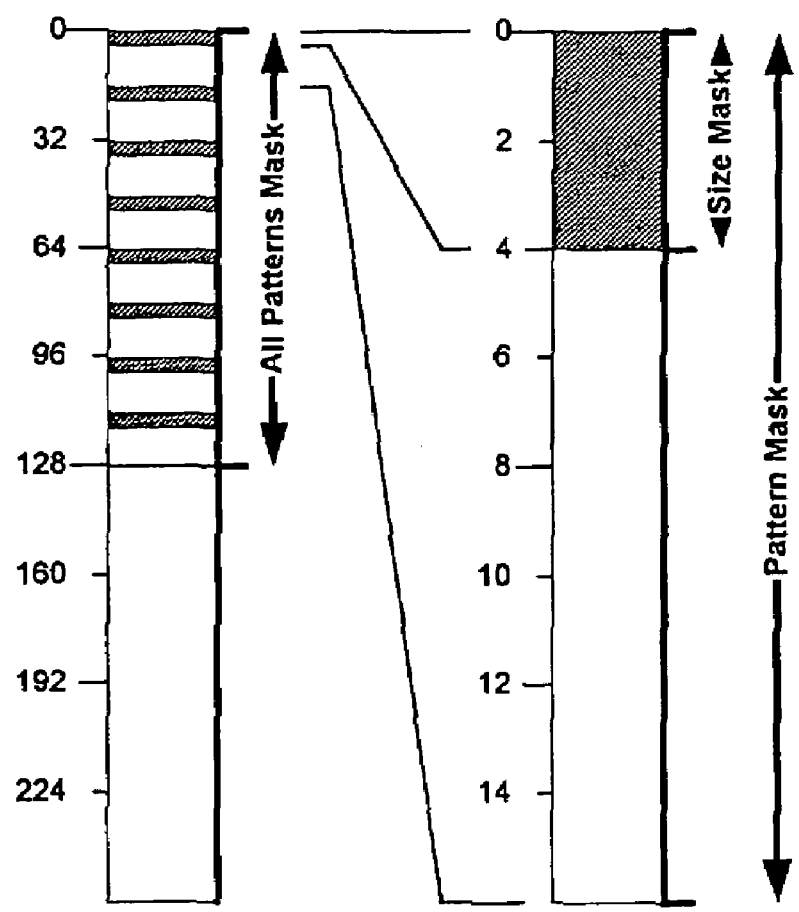
FIG. 7 is a graphical representation of the relationship between the repeating policy pattern and the various contiguous masks.

At step 50, a discontiguous mask is created using the three contiguous masks, from steps 44 through 48, which are the size mask, the pattern mask, and the all patterns mask. The discontiguous mask, which represents the policy area in all the repeating policy patterns, is made up of ones in each digit which has a value of 1 in an odd number of the contiguous masks (e.g., 1 or 3), and zeros in each digit which has a value of 1 in an even number of the contiguous masks (e.g., 0 or 2). For example, assume the range of one policy area is 0-3 (size mask 252) in an 8 bit address scheme with addresses from 0 to 255. This policy area is contained in a repeating policy pattern of 0-15 (pattern mask 240), which is contained in the set of repeating policy patterns that fills the range 0-127 (all patterns mask 128). In this example, the other ranges, which are also a part of the same policy area, are 16-19, 32-35, 48-51, 64-67, 80-83, 96-99, and 112-115. Hence, there are eight address ranges of four addresses each. FIG. 7 is a graphical representation of the relationship between the repeating policy pattern and the various contiguous masks.

Using the example and method above,

| | | | |
|---|---|---|---|
| Size Mask | 1 1 1 1 | 1 1 0 0 | (252) |
| Pattern Mask | 1 1 1 1 | 0 0 0 0 | (240) |
| All Patterns Mask | 1 0 0 0 | 0 0 0 0 | (128) |
| Resultant Mask | 1 0 0 0 | 1 1 0 0 | (140) | the resultant discontiguous mask is computed to be 140. Therefore, an address of 0 and a mask of 140 define all of the eight discontinuous address ranges of four addresses each. These address ranges are discontiguous because they are not adjacent to each other. The mask that defines these ranges is discontiguous because not all of the binary ones and zeros are contiguous with each other. Hence, a discontinuous set of address ranges is defined.

The following table shows the size mask, pattern mask and all patterns mask, which are used to compute the resultant discontiguous mask for each policy area in the enterprise network example.

| User Nets | |
|---|---|
| Size Mask | 11111111.11111111.11110000.00000000 (255.255.240.0) |
| Pattern Mask | 11111111.11111111.11100000.00000000 (255.255.224.0) |
| All Patterns Mask | 11111111.11111111.00000000.00000000 (255.255.0.0) |
| User Nets Mask | 11111111.11111111.00010000.00000000 (255.255.16.0) |
| Production Nets | |
| Size Mask | 11111111.11111111.11111111.00000000 (255.255.255.0) |
| Pattern Mask | 11111111.11111111.11100000.00000000 (255.255.224.0) |
| All Patterns Mask | 11111111.11111111.00000000.00000000 (255.255.0.0) |
| Production Nets Mask | 11111111.11111111.00011111.00000000 (255.255.31.0) |
| Web Nets | |
| Size Mask | 11111111.11111111.11111111.10000000 (255.255.255.128) |
| Pattern Mask | 11111111.11111111.11100000.00000000 (255.255.224.0) |
| All Patterns Mask | 11111111.11111111.00000000.00000000 (255.255.0.0) |
| Web Nets Mask | 11111111.11111111.00011111.10000000 (255.255.31.128) |

Figure 8:
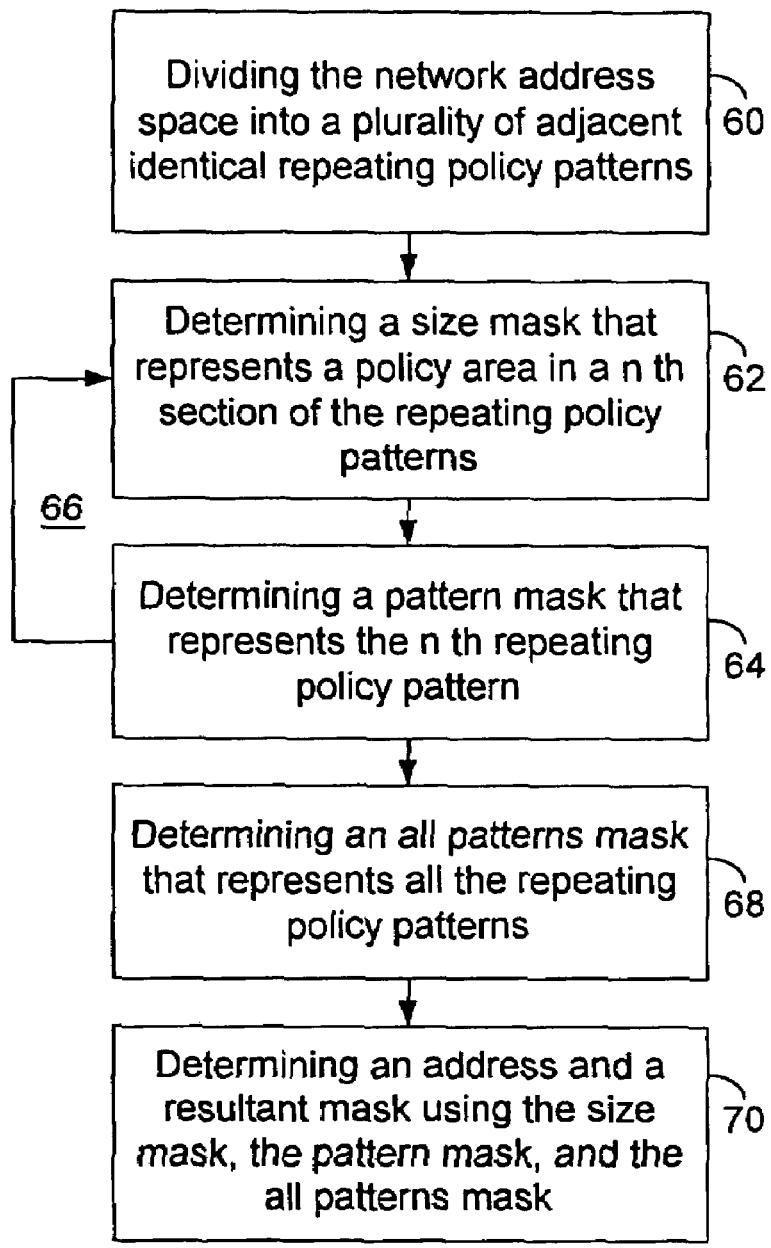
FIG. 8 is a simplified flow chart illustrating a method of creating a discontiguous address plan having repeating patterns within repeating patterns using an address and a mask.

FIG. 8 is a simplified flow chart illustrating a method of creating a discontiguous address plan having repeating patterns within repeating patterns using an address and a mask. The address plan described above can be modified to allow for repeating patterns within repeating patterns. That is, multiple security policy areas can be nested together to create the address plan. For example, a nested address plan may be "Pcnet Printer Pcnet Printer Production Webnet Pcnet Printer Pcnet Printer Production Webnet." Designing an address plan, which contains patterns within patterns, is desirable if multiple smaller policy area ranges are desired. In addition, nesting patterns is efficient when creating pre-defined network security policies for different classes of devices within each subnet. Nested patterns can also be used to provide a different number of instances of each policy area range within the highest level repeating policy pattern. When using binary address and mask ranges to define patterns within patterns, each component of each repeating policy pattern typically has a size which is a power of the base number, e.g., 2, and has beginning and ending boundaries which are multiples of a power of the base number.

The method of creating an address plan having patterns within patterns is similar to the method described above. For example, the above method can be modified to create repeating patterns by repeating steps 18, 20 and 22 above for each additional pattern desired. The following description further describes the modifications to the above method. The enterprise network address space is divided into an adjacent number of identical repeating policy patterns (step 60). In one embodiment, the repeating policy patterns do not have to be adjacent or identical. The total number of policy patterns is typically a multiple of a power of the base number and the size of each pattern is also typically a multiple of a power of the base number. Within each pattern there are an identical number of policy areas, some of which may be represented by repeating patterns, each of which is a power of the base number size at each level of repetition. For each policy area, the first address of the policy area is located in the first repeating policy pattern. The first address represents the range address. A size mask that represents the policy area size in the first repeating pattern (size mask 1) is determined at step 62. A pattern mask that represents the first repeating pattern up to the 2nd instance of the repeating pattern (pattern mask 1), is determined at step 64. Steps 62 and 64 are repeated (step 66) for each level of repeating pattern within pattern yielding size masks 2 through n and pattern masks 2 through n. An all patterns mask that represents all of the address space used by all repeating policy patterns (all patterns mask) is determined at step 68. In a binary address scheme, the discontiguous mask, which represents the policy area in all the repeating policy patterns within patterns, is made up of ones in each digit which have a value of 1 in an odd number of the contiguous masks (e.g., 1, 3, 5, 7), and zeros in each digit which have a value of 1 in an even number of the contiguous masks (e.g., 0, 2, 4, 6) (step 70).

Figure 9:
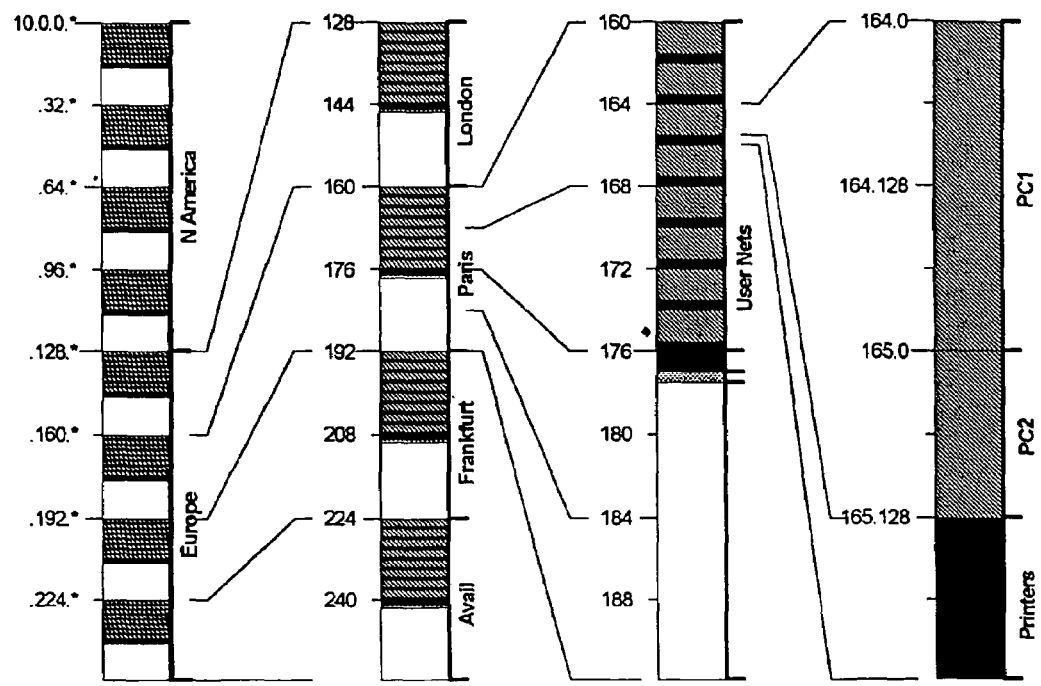
FIG. 9 is a graphical representation of the pattern within the pattern.

FIG. 9 is a graphical representation of the pattern within the pattern. The above example has been modified to add two repeating policy areas within each User Net area to illustrate the concept of the repeating policy patterns. Each User Net area includes 4,096 network addresses that are divided into 8 repeating spaces of 512 addresses each. Within each repeating space, the first 384 addresses are used for PCs within the User Net and the last 128 addresses are used for network printers within the User Net. Because the 384 addresses reserved for each PC range (e.g., Usernetpc) do not have a size that is a power of the base number, 2, the addresses in this example have been divided into two masked areas, one for the first 256 addresses (e.g., Usernetpc1) and the other for the last 128 addresses (e.g., Usernetpc2). Range sizes which are not a number that is a power of the base number are typically divided into the minimum number of masked areas which are powers of the base number.

The mask sizes for "Usernetpc1" are as follows:

Size mask 1 is the size of "Usernetpc1"

Pattern mask 1 is the size of "Usernetpc1 Usernetpc2 Usernetprinters".

Size mask 2 is the size of "(Usernetpc1 Usernetpc2 Usernetprinters)8"

Pattern mask 2 is the size of "(Usernetpc1 Usernetpc2 Usernetprinters)8 Productionnet Webnet Avail"

All patterns mask is the size of "((Usernetpc1 Usernetpc2 Usernetprinters)8 Productionnet Webnet Avail)8"

The 8 represents the number of times the preceding pattern is repeated.

Figure 10:
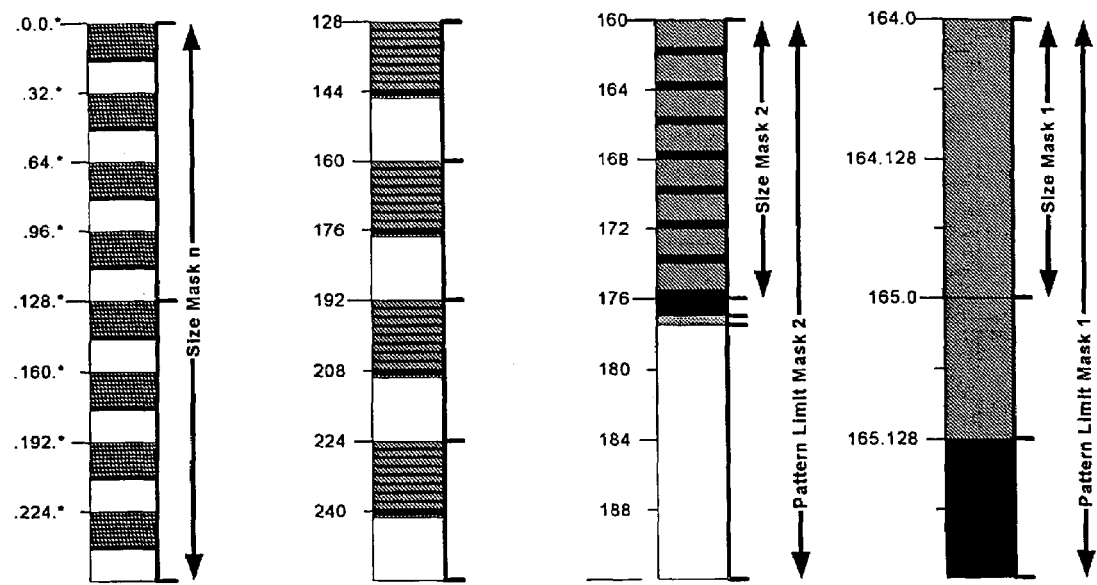
FIG. 10 is a graphical representation showing the size and pattern limit address ranges used to compute the masks.

FIG. 10 is a graphical representation showing the size and pattern limit address ranges used to compute the masks.

| User Net PC1 | |
|---|---|
| Size Mask 1 | 11111111.11111111.11111111.00000000 (255.255.255.0) |
| Pattern Mask 1 | 11111111.11111111.11111110.00000000 (255.255.254.0) |
| Size Mask 2 | 11111111.11111111.11110000.00000000 (255.255.240.0) |
| Pattern Mask 2 | 11111111.11111111.11100000.00000000 (255.255.224.0) |
| All Patterns Mask | 11111111.11111111.00000000.00000000 (255.255.0.0) |

-continued

| | |
|---|---|
| User Net PC1 Mask | 11111111.11111111.00010001.00000000 (255.255.17.0) |
| User Net PC2 | |
| Size Mask 1 | 11111111.11111111.11111111.10000000 (255.255.255.128) |
| Pattern Mask 1 | 11111111.11111111.11111110.00000000 (255.255.254.0) |
| Size Mask 2 | 11111111.11111111.11110000.00000000 (255.255.240.0) |
| Pattern Mask 2 | 11111111.11111111.11100000.00000000 (255.255.224.0) |
| All Patterns Mask | 11111111.11111111.00000000.00000000 (255.255.0.0) |
| User Net PC2 Mask | 11111111.11111111.00010001.10000000 (255.255.17.128) |
| User Net Printers | |
| Size Mask 1 | 11111111.11111111.11111111.10000000 (255.255.255.128) |
| Pattern Mask 1 | 11111111.11111111.11111110.00000000 (255.255.254.0) |
| Size Mask 2 | 11111111.11111111.11110000.00000000 (255.255.240.0) |
| Pattern Mask 2 | 11111111.11111111.11100000.00000000 (255.255.224.0) |
| All Patterns Mask | 11111111.11111111.00000000.00000000 (255.255.0.0) |
| User Net Printers Mask | 11111111.11111111.00010001.10000000 (255.255.17.128) |

In the above example, the address plan is optimized for route advertisement aggregation, security policy, and ACL deployment. In particular, each level of the routing hierarchy (e.g., each city and each continent) is aggregated into a single address range. In addition, there are 64 separate address ranges for User Net PCs, 64 separate address ranges for User Net Printers, and eight separate address ranges for each of the other two network security policy areas. Using contiguous ACL masks, 144 ACL entries are required to define these address ranges. However, using discontiguous ACL masks, as shown in the above example, the 144 address ranges can be defined using 5 ACL entries, two for the User Net PC ranges and one for each of the other policy areas. The 5 ACL entries are (1) User Nets PC1: address 10.0.0.0, mask 255.255.17.0, (2) User Nets PC2: address 10.0.1.0, mask 255.255.17.128, (3) User Nets Printers: address 10.0.1.128, mask 255.255.17.128, (4) Production Nets: address 10.0.16.0, mask 255.255.31.0, and (5) Web Nets: address 10.0.17.0, mask 255.255.31.128.

The maximum number of levels of patterns within patterns, which can be created within any particular network address scheme, is one half of the number of digits which can be masked. For example, in IPv4 network addresses there are 32 binary digits, and the maximum number of levels of patterns within patterns is 16.

The address plan described above can be modified to allow for a part of each repeating pattern to be different for a subset of all repeating patterns. This optimization can be helpful in situations where some policy areas are only needed in a subset of locations represented at a particular level of route advertisement aggregation. For example, address ranges within the patterns allocated to North America can be designated for high speed remote access and the same address ranges within the patterns allocated to Europe can be designated for wireless remote access.

In computing discontiguous masks for policy areas, which do not exist in all repeating patterns, the "All Patterns Mask" should include only those patterns that contain the policy area. For example, the all patterns mask for wireless remote access should include only the repeating patterns allocated to Europe and the all patterns mask for high-speed remote access should include only the repeating patterns allocated North America.

The address plan described above can be modified to allow for unequal sized aggregations at any level of route advertisement. For example, repeating patterns for two cities could be allocated to South America, two to North America and four to Europe. Or as a second example, two adjacent repeating patterns could be allocated to one city, which has greater address space requirements. Any combination of unequal sized aggregations is permissible. Preferably, each aggregation is comprised of adjacent repeating patterns, be a size which is a power of the base number, and fall on address boundaries, which are multiples of the size.

The foregoing detailed description of the present invention is provided for the purposes of illustration and is not intended to be exhaustive or to limit the invention to the precise embodiment disclosed. Several embodiments of the method of creating a discontiguous address plan have been described that are provided for the purposes of illustration and are not intended to be exhaustive or to limit the invention to the precise embodiment disclosed. The embodiments may provide different capabilities and benefits depending on the configuration used to implement the address plan. Accordingly, the scope of the present invention is defined by the following claims.

What is claimed is:

1. A method of creating an address and a discontiguous mask, comprising:
  dividing a network address space into a plurality of adjacent repeating policy patterns;
  determining a size mask that represents a policy area in a first repeating section of the repeating policy patterns;
  determining a pattern mask that represents the first repeating section of the repeating policy patterns;
  determining an all patterns mask that represents the repeating policy patterns; and
  creating the address and the discontiguous mask using the size mask, the pattern mask, and the all patterns mask.

2. A method as defined in claim 1, further comprising determining a starting address for the policy area that is a power of a base number.

3. A method as defined in claim 2, wherein the base number is selected from a group consisting of 2, 3, 5, 6, 8, 10, 12, and 16.

4. A method as defined in claim 1, wherein each of the plurality of adjacent repeating policy patterns are identical to one another.

5. A method as defined in claim 1, wherein each of the plurality of adjacent repeating policy patterns contains some information that is similar to and some information that is identical to at least one other repeating policy pattern.

6. A method of creating a discontiguous address plan having repeating patterns within repeating patterns using an address and a discontiguous mask, the method comprising:
  dividing a network address space into a plurality of adjacent repeating policy patterns;
  determining a size mask that represents a policy area in a repeating section of the repeating policy patterns;
  determining a pattern mask that represents the repeating section of the repeating policy patterns;
  repeating the determining steps until all patterns within patterns have been determined;
  determining an all patterns mask that represents the entire repeating policy patterns; and creating the address and the discontiguous mask using the size masks, the pattern masks, and the all patterns mask.

7. A method as defined in claim 6, further comprising determining a starting address for the policy area that is a power of a base number.

8. A method as defined in claim 7, wherein the base number is selected from a group consisting of 2, 3, 5, 6, 8, 10, 12, and 16.

9. A method as defined in claim 6, wherein each of the plurality of adjacent repeating policy patterns are identical to one another.

10. A method as defined in claim 6, wherein each of the plurality of adjacent repeating policy patterns contains some information that is similar to and some information that is identical to at least one other repeating policy pattern.

11. A method of creating a discontiguous mask for a network security policy area, comprising:
- allocating network addresses for the network security policy area;
- assigning the network addresses to a plurality of policy patterns;
- determining a size mask that represents a size of a policy area in a first section of the plurality of policy patterns;
- determining a pattern mask that represents a size of the first section of the plurality of policy patterns;
- determining an all patterns mask that represents a size of the plurality of policy patterns; and
- creating the discontiguous mask using the size mask, the pattern mask, and the all patterns mask.

12. A method as defined in claim 11, wherein the size of the policy area is a power of a base number.

13. A method as defined in claim 12, wherein the base number is selected from a group consisting of 2, 3, 5, 6, 8, 10, 12, and 16.

14. A method as defined in claim 11, further comprising creating an address using the size mask, the pattern mask, and the all patterns mask.

15. A method as defined in claim 11, wherein the plurality of policy patterns includes a plurality of adjacent repeating policy patterns.

16. A method as defined in claim 15, wherein each of the plurality of adjacent repeating policy patterns is identical to one another.

17. A method as defined in claim 11, wherein the size of the first section of the plurality of policy patterns is a power of a base number.

18. A method as defined in claim 17, wherein the base number is selected from a group consisting of 2, 3, 5, 6, 8, 10, 12, and 16.

19. A method as defined in claim 11, wherein the size of each of the plurality of policy patterns is a power of a base number.

20. A method as defined in claim 19, wherein the base number is selected from a group consisting of 2, 3, 5, 6, 8, 10, 12, and 16.

* * * * *

UNITED STATES PATENT AND TRADEMARK OFFICE
CERTIFICATE OF CORRECTION

PATENT NO. : 7,400,591 B2  
APPLICATION NO. : 11/142643  
DATED : July 15, 2008  
INVENTOR(S) : John Melvin Brawn et al.

It is certified that error appears in the above-identified patent and that said Letters Patent is hereby corrected as shown below:

In column 6, line 56, after "are" delete "is".

In column 7, line 47, delete "ore" and insert -- or --, therefor.

Signed and Sealed this

Thirtieth Day of September, 2008

JON W. DUDAS  
*Director of the United States Patent and Trademark Office*